(12) United States Patent
Grosskopf

(10) Patent No.: US 6,226,036 B1
(45) Date of Patent: May 1, 2001

(54) DEVICE FOR OPTICAL INVESTIGATION OF AN OBJECT

(76) Inventor: Rudolf E. Grosskopf, Eschenweg 11, D-89551, Königsbronn (DE)

( * ) Notice: Subject to any disclaimer, the term of this patent is extended or adjusted under 35 U.S.C. 154(b) by 0 days.

(21) Appl. No.: 08/963,718

(22) Filed: Nov. 4, 1997

(51) Int. Cl.⁷ .................................................. H04N 5/232
(52) U.S. Cl. .................................... 348/350; 348/345
(58) Field of Search .............................. 250/201.2, 201.3, 250/201.7–201.9, 208.1, 216, 201; 396/111–120, 126, 127, 324, 327, 330; 348/345, 350

(56) References Cited

U.S. PATENT DOCUMENTS

| | | | |
|---|---|---|---|
| 4,408,853 | * | 10/1983 | Tokutomi et al. .................... 396/112 |
| 4,492,449 | * | 1/1985 | Oinoue et al. ..................... 396/201.7 |
| 4,500,189 | * | 2/1985 | Aoki ................................. 250/201.8 |
| 4,845,352 | * | 7/1989 | Benschop .......................... 250/201.7 |
| 4,849,782 | * | 7/1989 | Koyama et al. ...................... 396/114 |
| 5,239,178 | * | 8/1993 | Derndinger et al. ................. 250/234 |

\* cited by examiner

*Primary Examiner*—Wendy R. Garber
*Assistant Examiner*—Mitchell White
(74) *Attorney, Agent, or Firm*—Fish & Richardson P.C.

(57) ABSTRACT

A two-dimensional illuminating grid (11b) illuminates an object (14). Its spacial form is measured by imaging through a prism grid (66) on a receiver array (17), with the prism grid performing a pupil division for the image of each of the illuminated object points. For this purpose, for each measurement point, the difference signal from each of four adjacent pixels (8a, 8b, 9b, 9a) of a receiver array (17) is evaluated. For example, 65,000 points in space can be measured in 20 ms.

7 Claims, 6 Drawing Sheets

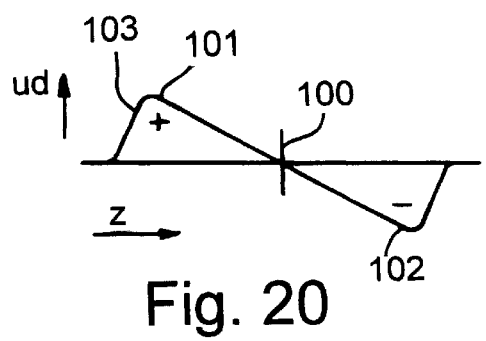
Fig. 21
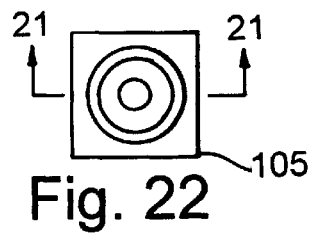
Fig. 22
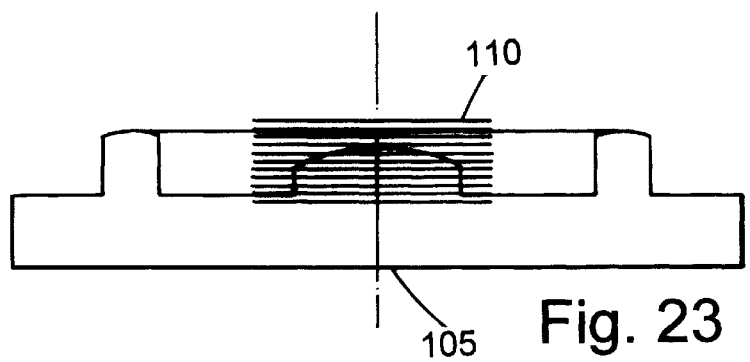
Fig. 23
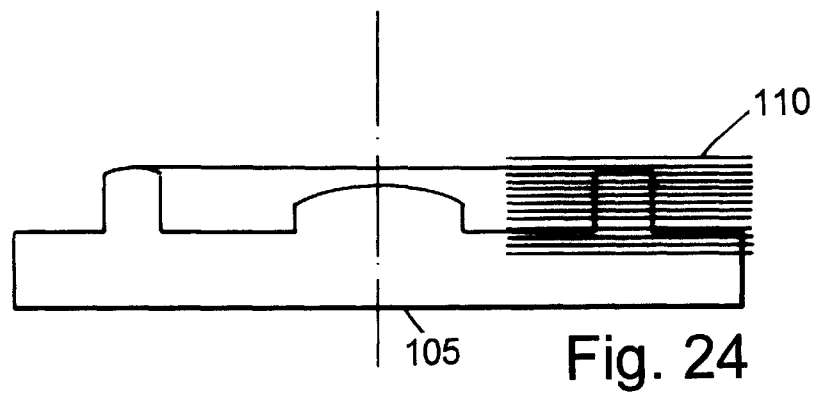
Fig. 24
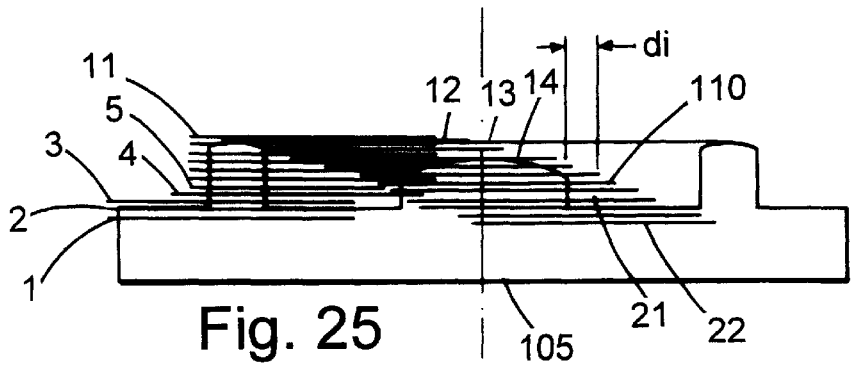
Fig. 25

DEVICE FOR OPTICAL INVESTIGATION OF AN OBJECT

BACKGROUND

The present invention relates to a device for three-dimensional investigation of an object according to the preamble of claim 1.

A device of this kind is known from DE 40 35 799. In that patent, an illuminating grid with a pixel size is imaged on a receiver array, which matches the pixel size of the photosensitive areas of the receiver array or is a whole-number multiple of said array. The diaphragm action of the receiver array is utilized. A system of this kind has the disadvantage that during the evaluation of images taken from various focal planes to determine the depth values, the absolute brightness values are always evaluated and their maximum must be determined.

A device is known from JP 1-55513(Feb. 3, 1989) which is suitable for rapidly focusing a microscope using incident light from the aid of a laser beam. For this purpose, a photodiode is utilized with four receiver segments and the object point illuminated by the laser is imaged through an optical system with cylindrical lenses on the four-quadrant receiver. This principle differs however basically in its effect from pupil division, since no focused image of the object point is produced. The device according to JP 1-55513 is unsuitable for rapid 3-D measurement.

DD 265 224 likewise describes a device with point-wise object illumination, but it only makes it possible to measure an object location simultaneously. It is likewise unsuited for rapid measurement of large sample areas.

DE 26 34 655 teaches a device for focusing a single-lens reflex camera. It is unsuited for measuring 3-D objects.

In the book "Technische Optik" [Technical Optics] by Gottfried Schroeder, Vogel-Verlag, 1977, page 145, a device from the field of photography is described that uses a double prism and serves to focus a camera. Since only one object position is detected, this system cannot be used for automatic measurement of larger object areas.

A device that makes it possible to determine the focus of an individual measurement point with a zero signal detection is known from the company publication "Microfokus, Beruehrungslos messen" [Microfocus, Measurement with Zero Contact] from UBM Messtechnik, D 76275 Ettlingen. In that publication, the light from a laser diode is imaged on the object to be illuminated and the light reflected from this object is split by a pair of prisms so that the two half pupils are imaged on two receiver pairs. The light from a laser diode is imaged on the object to be measured and the light reflected from the object is split by the pair of prisms in such fashion that two half pupils are imaged on two receiver pairs*. A system of this kind, apart from the focus, supplies a directional signal that indicates the direction in which the position of the measured object differs from the focus position. However, only a single point on the object is detected. Measurements with a system of this kind therefore require a great deal of time, especially when large areas of the object are to be measured.

*Evident repetition. Translator's note.

SUMMARY OF INVENTION

The present invention has the goal of providing a device that makes it possible to determine focus with zero signal detection and in this way to detect many measurement points at the same time. This goal is achieved according to the invention by the combination of features in claim 1.

Advantageous embodiments of the invention are shown in claims 2 to 6.

The system according to the invention has the advantage that the focus position of the individual measurement points is determined by zero signal detection and that very many measurement points are detected simultaneously. This is performed economically because receiver arrays, preferably CCD arrays, and prism arrays in the prism plane are used as the radiation receivers. The arrays can be produced economically by compression molding for example.

Zero signal detection is implemented by the arrangement of the receiver array relative to the prism array being so designed that in the focus case the image of the light reflected from the illuminated point on the sample and deflected by a prism falls symmetrically on the boundary line between two radiation receivers (pixels) of the receiver array.

The system according to the invention differs from the system described in Patent DE 40 35 799 in that the diaphragm function of the radiation receivers arranged in an array is utilized in the latter, with the photosensitive areas of said receivers being separated from one another by gaps. Focus detection is performed in this patent by evaluating the intensity maximum detected on each pixel of the radiation receiver array. For this purpose, a measurement series is performed that stores the values for several different z-positions of the object in the computer. For each pixel, this determines the z-position at which its intensity has its maximum. It supplies the depth value to be determined. In the present invention, on the other hand, the difference between the signals of two adjacent pixels and the receiver array is evaluated. When it is equal to zero, the focus position exists that supplies the depth of value to be determined. Receiver arrays are used for this purpose that have no zone that is insensitive to light, or only a small zone of this kind, between adjacent pixels. Instead, for detecting the difference signal in the present invention, it is necessary to use receiver arrays with photosensitive areas that are directly adjacent to one another. For this reason, the system according to the present invention differs basically from that described in the abovementioned DE.

The system according to the invention is especially suitable for three-dimensional measurement of mechanical parts in incident light and for recording 3-D images of fluorescent objects. For mechanical parts, a semi-transparent mirror is placed in known fashion in the beam path to separate the illuminating light from the light reflected from the object. For fluorescence applications, a dichroic mirror is used in a manner known of itself, and possibly light filters as well, to separate the illuminating light and the light emitted by fluorescence from the object.

DESCRIPTION OF THE DRAWINGS

The invention will now be described in greater detail with reference to the embodiments shown in FIGS. 1 to 19.

FIG. 20 shows the curve of the difference signal of a radiation receiver pair as a function of the difference in focus;

FIGS. 21 and 22 show a mechanical part that serves as an example to explain the measurement strategy, and FIGS. 23 and 25 show the positions of various image sequences relative to the part to be measured.

In FIG. 1, (11) refers to a light source, for example a halogen lamp, which, with the aid of condenser (11$k$) and possibly with a filter (11$f$) (to separate out a sufficiently narrow range of the spectrum), holes (12$l$) in a layer (12$s$). A layer of this kind can be produced in known fashion for example from chromium on a glass plate (12$g$). The holes (12$l$) are arranged in a layer (12$s$) in the same grid shape as the photosensitive areas of receiver array (17). For example, if a receiver array with 512×512 receivers is used, said receivers being arranged in the form of a grid at a distance of 11 $\mu$m, the layer then has 256×256 holes spaced 22 $\mu$m apart and with a hole size of 4 $\mu$m×4 $\mu$m for example. Hence, the holes are much smaller than their spacing. The spacing of the holes or areas from center to center is termed the grid size.

Figure 1:
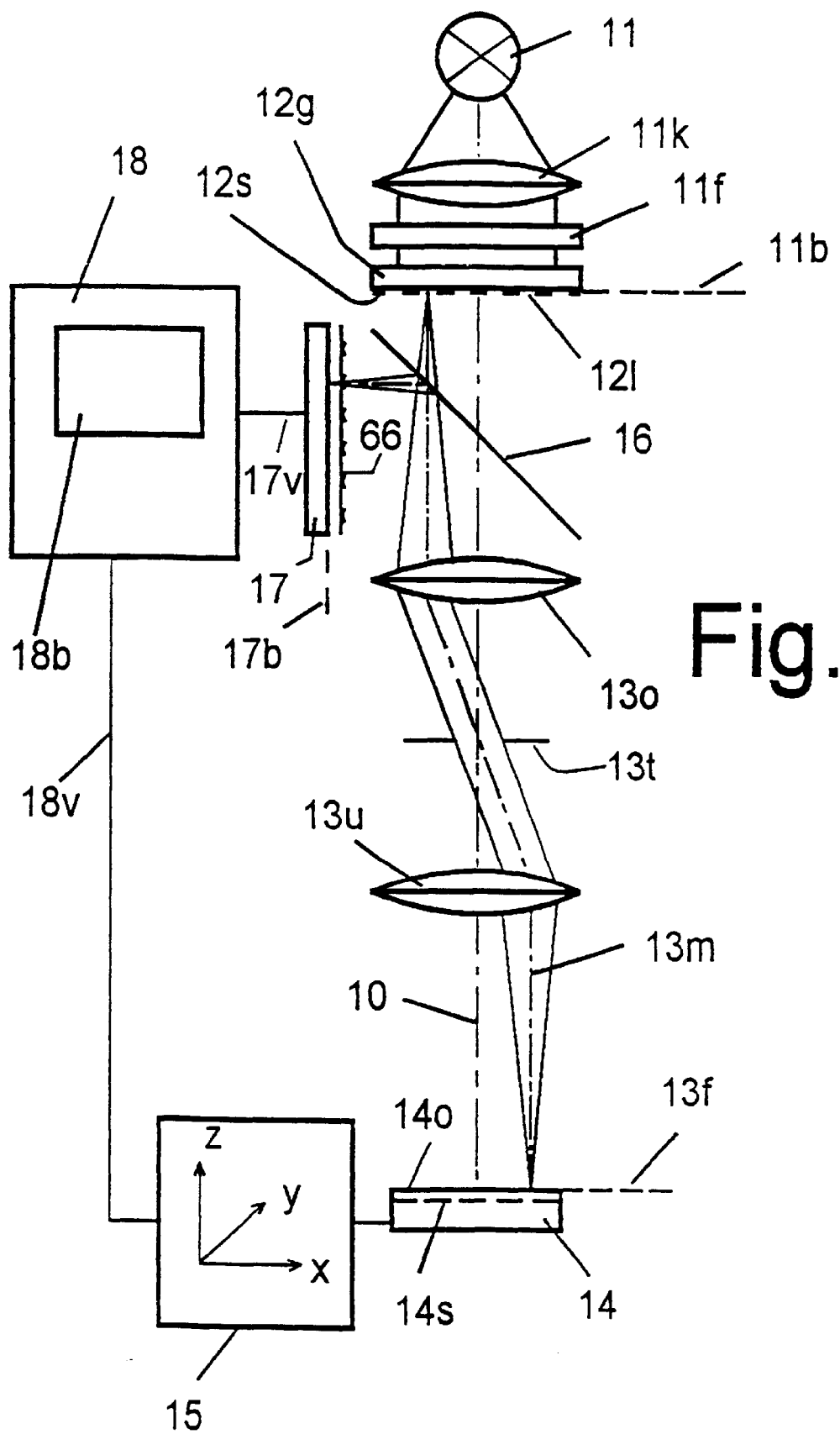
FIG. 1 is a design in which the illuminating grid is produced by a glass plate with holes.

The illuminating grid that is generated by illuminated holes (12$l$) in layer (12$s$) lies in illumination plane (11$b$). This plane is imaged by lenses (13$o$, 13$u$) in focal plane (13$f$), so that in the latter object (14) is illuminated with points of light arranged in the form of a grid. In the case of objects that are not transparent, only surface (14$o$) can be illuminated, while in transparent objects, layers (14$s$) inside can also be illuminated with the light points. The light beams reflected from the object in focal plane (13$f$) are focused by lenses (13$u$, 13$o$) through a beam splitter (16) in diaphragm plane (17$b$). Diaphragms are produced in prism plane (66) by the edges of the prism pairs that are separated from one another by gaps. Between lenses (13$o$, 13$u$), a so-called telecentric diaphragm (13$t$) is usually provided, said diaphragm ensuring that center beam (13$m$) strikes object (14) parallel to optical axis (10) so that the positions of the points of light on the object do not change if object (14) is moved in the direction of optical axis (10).

The above-mentioned beam splitter (16) is made in the form of a semi-transparent mirror for incident light applications. For fluorescence applications, a dichroic mirror is used in known fashion.

Object (14) can be moved by an adjusting device (15) in all three directions in space, so that various layers (14$s$) of object (14) can be scanned. The movement in the x- and y-directions can be made smaller than the grid size of light points (12). Of course, the movement of object (14) in the z-direction can also be produced by shifting lenses (13$o$, 13$u$) in the direction of optical axis (10) and similarly, instead of moving the object in the x- and y- directions, the layer (12$s$) with the holes (12$l$) and the receiver array (17) can be moved accordingly as well.

The signals from receiver array (17) are transmitted through a connecting line (17$v$) to a computer (18) which performs the evaluation in known fashion and displays the results of the evaluation on a screen (18$b$), for example in the form of graphic images. Computer (18) can also control the shifting of focal plane (13$f$) in the object and scanning in the x- and y- directions through connecting line (18$v$). This control can be provided in the computer as a fixed program or can be performed as a function of the results of the evaluation.

Figure 2:
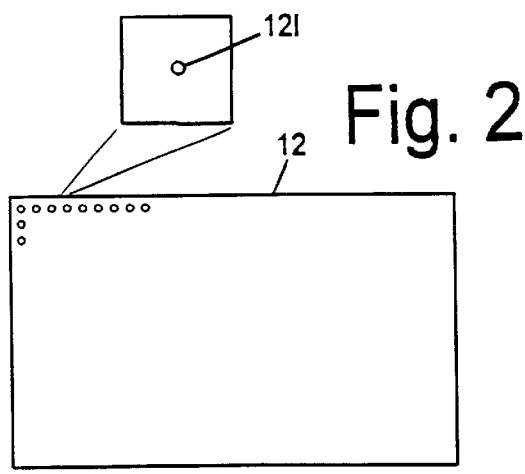
FIG. 2 shows a glass plate with holes.

FIG. 2 shows a glass plate (12$g$) in a top view, with an illumination point (12$l$) being shown enlarged. The provision of the illumination points in the shape of an array is merely indicated; in reality, as already mentioned, with a grid-type arrangement, for example, there are 256 lines with 256 illuminated points each.

Figure 3:
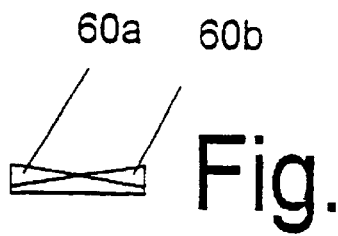
FIG. 3 shows a pair of prisms in a side view.

In FIG. 3, a single prism pair is shown in a side view. It consists of two wedged-shaped partial prisms (60$a$) and (60$b$) which are arranged opposite one another so that the light falling on different partial prisms is deflected in opposite directions.

Figure 4:
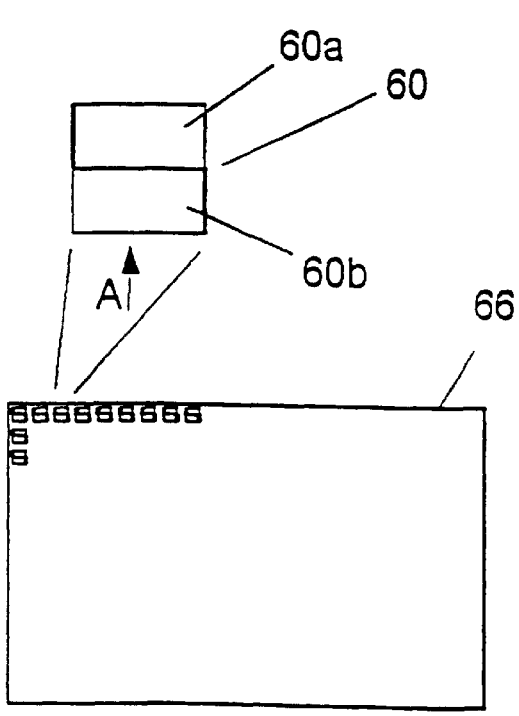
FIG. 4 shows a prism array with rectangular pairs of prisms.

FIG. 4 shows a prism array (66) in a top view. A single prism pair (60) is shown enlarged and consists of prisms (60$a$ and 60$b$) located opposite one another. It is advantageous to provide as many pairs of prisms as there are illumination points.

Figure 5:
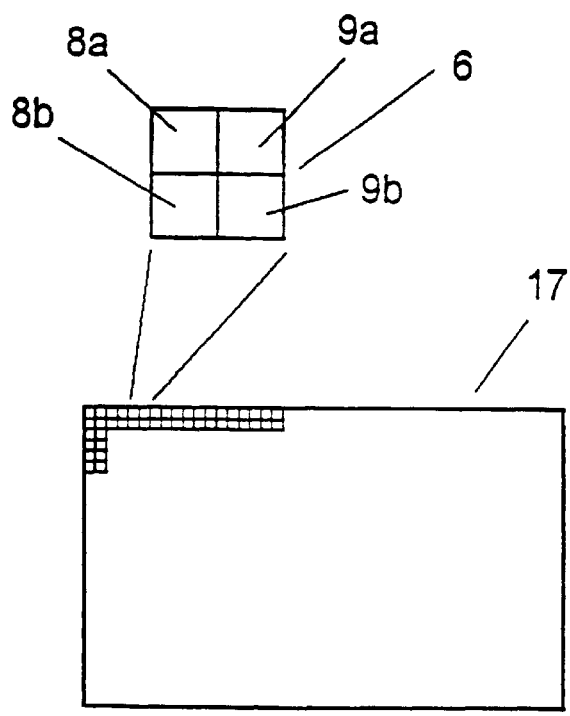
FIG. 5 shows a receiver array on the same scale.

FIG. 5 shows, on the same scale, the corresponding receiver array (17). A receiver quadruple (6) is associated with each prism pair, said quadruple consisting of receiver pair (8$a$, 8$b$) and receiver pair (9$a$, 9$b$) and hence of a total of four individual receivers (8$a$, 8$b$, 9$a$, 9$b$).

Figure 6:
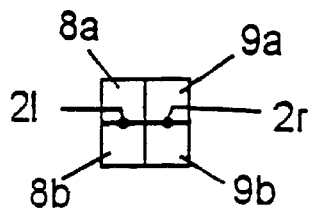
FIG. 6 shows a receiver quadruple with images of the illuminated point the focus case.

FIG. 6 shows the images (2$l$, 2$r$) of the two half-pupils generated by a prism pair in the focused state. It is evident that the focus images fall symmetrically on the receiver pairs, in other words receivers 8$a$ and 8$b$ receive equal amounts of light. The same is true of receivers 9$a$ and 9$b$.

Figure 7:
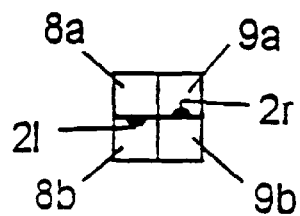
FIG. 7 shows a receiver quadruple with images of the illuminated point outside the focal position.

Outside the focus however, more light falls on one of the receivers of a pair than on the other. This is shown in FIG. 7. Receiver 8$b$ receives more light than receiver 8$a$ and receiver 9$a$ receives more light than receiver 9$b$. The lack of symmetry is reversed if the position of sample (14) deviates in the other direction from the focus position. Then receiver 8$a$ receives more light than receiver 8$b$ and receiver 9$b$ receives more light than receiver 9$a$. Thus the direction signal is obtained. For example, it can be used to measure objects (14) that are larger than the visual field of the system by scanning in a manner known of itself. In this way it is possible, as object (14) is moving, to calculate a signal for the average deviation from the focus and to adjust the z-position of the object relative to the measuring system in a coordinate measuring device in such a way that it follows the surface contours of the object. If this takes place at a certain speed, so that the computer is always aware, on which receiver the partial areas of the object that are in the visual field are imaged at different points in time, it is possible, in a form of a "trail", to detect an entire strip on the object quickly and to evaluate the peaks from the recorded data.

Figure 9:
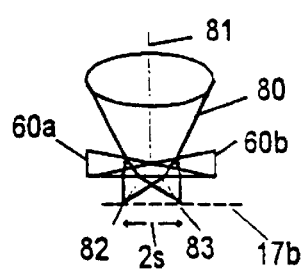
FIG. 9 shows a light cone with a pair of prisms and a split beam.
Figure 8:
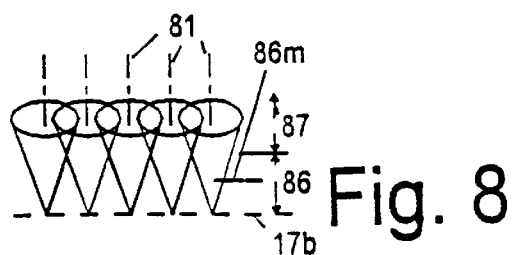
FIG. 8 shows several light cones in the vicinity of the receiver array and in perspective without the prism array.

FIGS. 8 and 9 serve to explain in detail the beam path as it is split by the prisms. First of all, it is important to locate the prism array at a suitable distance from the receiver array. This is clear in FIG. 8, which shows the light cones of several simultaneously illuminated object points in front of the detector array and their midlines (81). In area (87), the light cones overlap while in area (86) they are separate from one another. The prism array is advantageously located approximately in the center (86m) of area (86). Then the distance between the light cones is large enough and the distance from the receiver array is likewise sufficient. It is necessary in order for the two partial images of the pupils to reach the receiving grid sufficiently far apart.

FIG. 9 shows one of the light cones with its midline (81) and a prism pair consisting of prisms (60a and 60b). The two images (82 and 83), offset laterally from midline (81) of the light that strikes through the cone, are in focus in the example shown, in other words they are sharply imaged on receiver plane (17b). One can also see the lateral offset (2s) of the two focal points.

Figure 10:
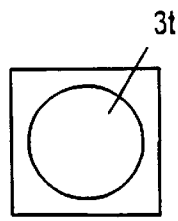
FIG. 10 shows a telecentric diaphragm designed as a full pupil.
Figure 11:
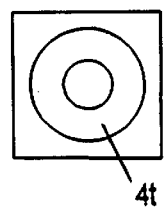
FIG. 11 shows a telecentric diaphragm designed as an annular pupil.

FIG. 10 shows the full pupil of the telecentric diaphragm. It is based on the explanations above. Since the middle beams contribute little to the z-resolution, however, it can be advantageous to screen them out, using an annular diaphragm. An example of this is shown in FIG. 11. Only ring (4t) is permeable to light, so that the light beams close to the center are not imaged. The dynamic range of the radiation receiver array can be better utilized as a result, so that a greater deviation signal is obtained outside the focal position.

Figure 12:
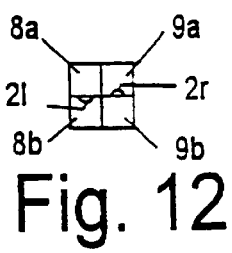
FIG. 12 shows a receiver quadruple with images of the illuminated point outside the focal position when using an annular pupil.

FIG. 12 shows this. It shows the images of the half-pupils in a position in which the corresponding object point is located outside the focus, whereby have a half-moon shape [sic]. This can have considerable practical advantages because with equal control, the deviation signal, in other words the difference between the light striking the two receivers of a pair is greater than when a full pupil is used.

Figure 13:
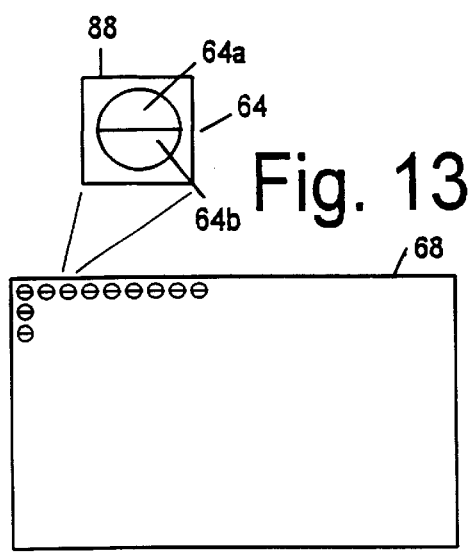
FIG. 13 shows a prism array with prism pairs delimited in the shape of a circle and gaps that are not permeable to light.

FIG. 13 shows another embodiment of the prism array. The prism pair (64) on prism array (68) are here delimited in the shape of a circle and each of the two prisms (64a and 64b) fills a semi-circle. The gaps (88) are not transparent to light. Thus a portion of the light that comes from object points located far outside the focus is screened from the receiver array. As a result, noise signals are suppressed. This noise signal suppression, as indicated by the above remarks, is produced by a diaphragm function that is exercised by the marginal boundaries of the circular areas. In contrast to the previously known arrangement according to DE 40 35 799, the diaphragm function follows from the prism array according to the invention and not from the receiver array. In addition, the diaphragm function in the present invention is not absolutely necessary. It has only a function-improving effect.

Figure 14:
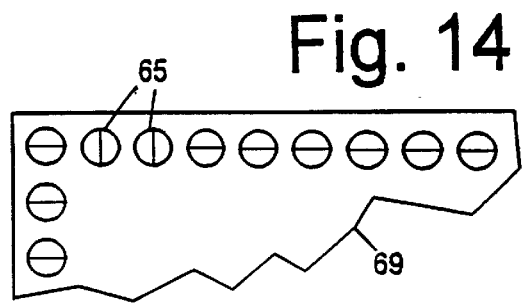
FIG. 14 shows a prism array as in FIG. 13, in which two prism pairs are shown rotated.

FIG. 14 shows that two prism pairs (65) are arranged so that they are rotated through 90° relative to the others. Thus it is possible, with objects with a structured surface, to record the structure properties as well. Direction-dependent reflection properties of the object can be detected in this manner.

Figure 15:
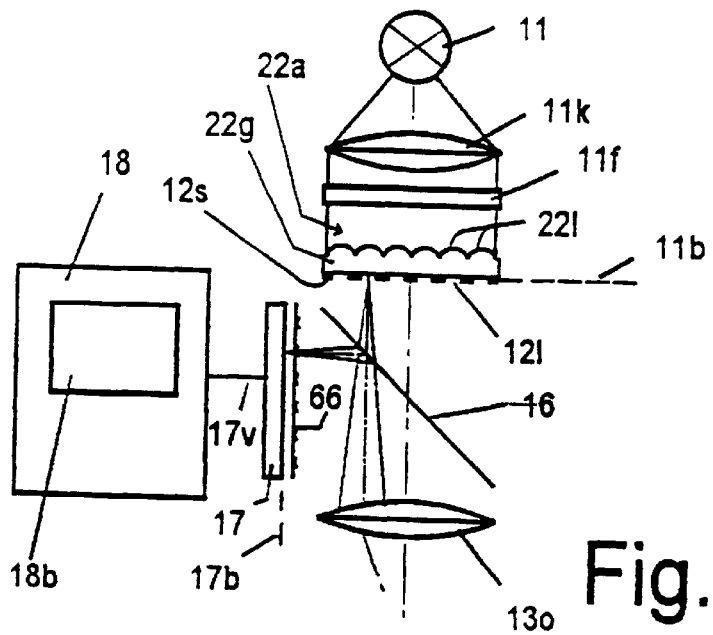
FIG. 15 shows a system with illumination of the holes with a lens array.

In FIG. 15, a lens array (22a) is located between condenser (11k) and filter (11f) and layer (12s) with holes (12l), said array containing the same number of small lenses (22l) as layer (12s) has holes (12l). Lenses (22l) have the purpose of imaging the images of the luminous filaments of light source (11) in the holes, thus giving the points of light a greater intensity.

Lens array (22a) and layer (12s) with holes (12l), as indicated, can be combined into one common part (22g). The manufacture of suitable lens arrays is known for example from a publication by K. Koizumi (SPIE, Volume 1128, 74 (1989).

Figure 16:
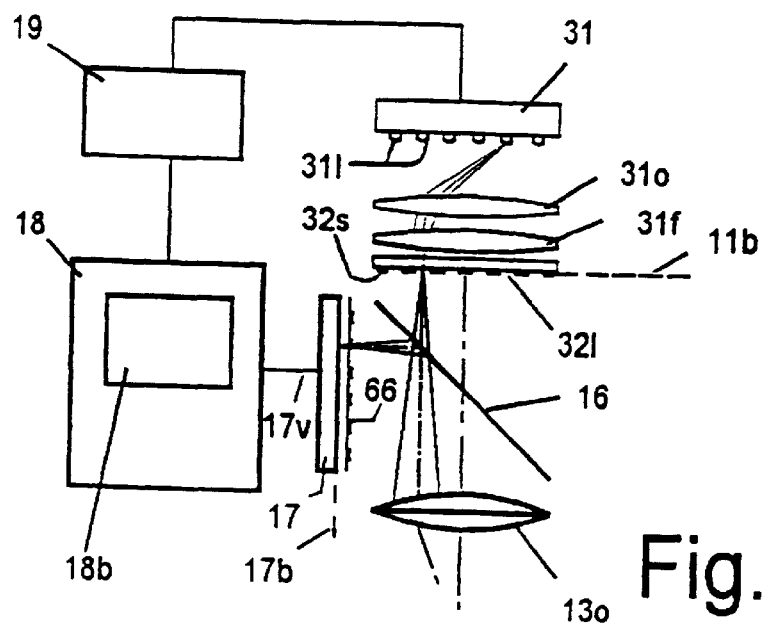
FIG. 16 shows a system with a light source array for illumination.

An especially advantageous version of the illuminating grid is shown in FIG. 16. In that figure, (31) represents a light source array, with can consist for example of light-emitting diodes (LEDs) (31). In this case also, it can be advantageous to locate in illumination plane (11b) a layer (32s) with holes (32l) so that the points of light have dimensions that are sufficiently small. Except for lens (31o) for imaging, a field lens (31f) is advantageous for additional imaging in the beam path.

It is advantageous to use integrated LED arrays for the illuminating grid, like those described for example in a paper by J. P. Donnelly (SPIE 1043, 92 (1989)). Such LED arrays have the advantage that certain partial quantities of LEDs can be switched on and off. In both cases, the switching on and off is controlled by computer (18) through switching device (19).

The beam path shown in FIGS. 1, 15 and 16 between illuminating plane (11b), focal plane (13f) and diaphragm plane (17b) is only a special embodiment of several known beam paths in which the invention can be used in a manner that is immediately apparent to the individual skilled in the art. In addition, in the beam path shown, an image of illuminating plane (11b) is not necessary in focal plane (13f) on a scale of 1:1. Instead, not only reduction, as is known from microscopes, but also enlargements are possible, for which reason the term "microscope" was not used in the above.

Figure 17:
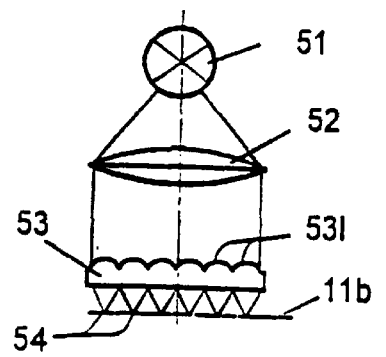
FIG. 17 shows an illuminating system for generating the point grid without using a hole grid.

In FIG. 17, the illuminating grid is formed by a lens array (53), which, thanks to its sufficiently good imaging properties, produces sufficiently small points of light (54) in illuminating plane (11b) from a nearly point-shaped light source (51). Condenser lens (52) causes lens array (53) to be traversed by a parallel bundle, so that each individual lens (53l) is utilized optimally.

Figure 18:
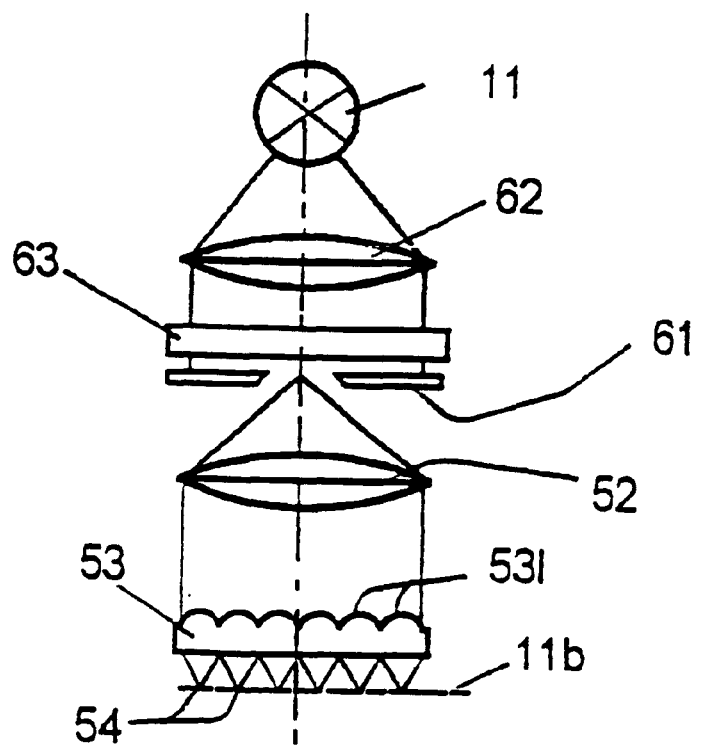
FIG. 18 shows a system in which, by means of a lens array, a diaphragm is multiply imaged in the illumination plane.
Figure 19:
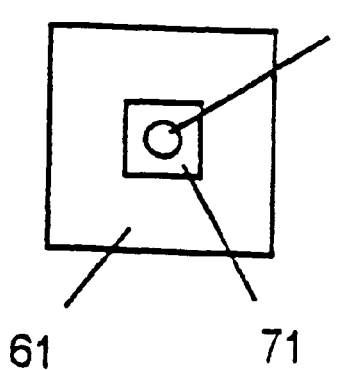
FIG. 19 shows an example of a diaphragm for the system in FIG. 18.

FIG. 18 shows a system in which a diaphragm (61) is multiply imaged in illuminating plane (11b) by a lens array (53). This diaphragm is illuminated by light source (11) through condenser (62) and diffuser (63). A wide variety of embodiments is possible for the diaphragm. As an example, FIG. 19 shows a diaphragm (61) with a square boundary for light-permeable area (71) and a light-impermeable center (72) for an illuminating grid.

FIG. 20 shows schematically the curve (103) of the difference signal from a sensor pair as a function of the focal position. It is evident that the signal is equal to zero at the focus (100) and runs approximately linearly in a range (101) to (103). By a calibration process, the slope can be determined relative to the focus shift and the location of the focus can be determined in the computer even without scanning the focal plane itself. This is a very important advantage over known confocal systems.

FIGS. 21 and 22 show a mechanical part (105) in two views that serves as an example for explaining advantageous measurement strategies.

In FIG. 23, section A—A through part (105) is shown enlarged and the sequence of different image planes (110) is shown, said planes being superimposed on one another in the focal direction (z-direction).

FIG. 24, like FIG. 24 [sic], shows another sequence (110) of different image planes superimposed on one another for measuring another area of mechanical part (105).

In FIG. 25, a sequence 1 to 22 of image planes is shown of which some (5 to 11) are located on top of one another and others (11 to 22 for example) are arranged so that they overlap at an angle. Recording images that overlap at an angle is advantageous if the measuring device in which the sensor according to the invention is used does not have a rapid drive for x-y movement of the sensor relative to the object or of the object relative to the sensor. Thus, the shifts can take place discontinuously or quasi-continuously without a rapid drive being required that would permit rapid acceleration and rapid stops. Without adversely influencing the measurement speed, more economical systems can be built.

What is claimed is:

1. An apparatus for optical investigation of an object, said apparatus comprising:

a two-dimensional illuminating grid located in an illuminating plane, said grid producing a plurality of points of light for illuminating an object to be observed, a lens system that images the illuminating grid in a focal plane at the location of object and images an object light grid radiated from the object into a receiver plane as an imaged light grid, said receiver plane being arranged to be optically conjugate to the illuminating grid;

a two-dimensional receiver array of receiver pixels, said array of receiver pixels being an array of photosensitive areas that are separated from one another and associated with light points of the object light grid, said photosensitive areas registering light points transmitted by the lens system;

a prism grid that is two-dimensional and is associated with and located in front of the receiver array, said prism grid including a plurality of wedge-shaped prism pairs that deflect light laterally; and a processor, wherein during operation the prism grid is illuminated by the object light grid so that each light point of the object light grid is associated with a different corresponding prism pair of said plurality of prism pairs, wherein the prism grid is located at a distance from receiver array, at which, for each prism pair the light emerging from the associated light point of the object light grid when that associated light point lies in said focal plane falls into an aperture defined by that prism pair, wherein the photosensitive areas of the receiver array directly adjoin one another and a different at least two receiver pixels of the receiver array are associated with each prism pair, and wherein for each prism pair, the light emerging from the associated light point of the object light grid when that associated light point lies out of said focal plane is imaged symmetrically between receiver pixels that are associated with that prism and receiver pixels are impacted increasingly asymmetrically as the associated light point is located further outside the focal plane, and wherein the processor is programmed to determine individually for each of the light points of the object light grid a deviation from a focus position and hence a depth value for asymmetrically impacted at least two receiver pixels.

2. The apparatus according to claim 1 wherein the two wedge-shaped prisms of each wedge-shaped prism pair are arranged to be directly adjacent to one another, with their wedge directions being aligned opposite to one another in each case.

3. The apparatus according to claim 2 wherein adjacent prism pairs within the prism grid are aligned perpendicularly to one another in pairs.

4. The apparatus according to claim 1, further comprising a telecentric diaphragm placed in a beam path between the illuminating grid and the lens system, said telecentric diaphragm formed as an annular diaphragm.

5. The apparatus according to claim 1, further comprising a transmission beam splitter that decouples light reflected toward receiver array (17) is decoupled in reflection by a transmission beam splitter (16) located between illuminating grid (121) and objective system (13u), with transmission beam splitter (16) being optionally designed as a dichroic mirror and decoupling the fluorescent light of object (14) to be observed.

6. The apparatus according to claim 1, further comprising data storage for storing digitized maximum values for the object.

7. The apparatus according to claim 2 wherein adjacent prism pairs within the prism grid are aligned non-parallel to one another in pairs.

* * * * *

UNITED STATES PATENT AND TRADEMARK OFFICE
CERTIFICATE OF CORRECTION

PATENT NO. : 6,226,036 B1
DATED : May 1, 2001
INVENTOR(S) : Rudolf E. Grosskopf

It is certified that error appears in the above-identified patent and that said Letters Patent is hereby corrected as shown below:

Title page,
Please insert Item [30], Foreign Priority Application Data,
-- Germany, 19648316.6-42, filed November 21, 1996 --.
Item [56], under References Cited, please insert the following:
-- FOREIGN PATENT DOCUMENTS

| | | |
|---|---|---|
| 265 224 A1 | 02/1989 | Germany |
| 26 34 655 C2 | 05/1984 | Germany |
| 40 35 799 C2 | 10/1995 | Germany |
| 1-55513 | 03/1989 | Japan -- |

Column 7,
Line 27, "," should be -- ; --

Column 8,
Line 14, insert -- pair -- after "prism"

Signed and Sealed this

Thirtieth Day of July, 2002

Attest:

Attesting Officer

JAMES E. ROGAN
*Director of the United States Patent and Trademark Office*